United States Patent [19]

Nishihara

[11] 4,456,640
[45] Jun. 26, 1984

[54] AUTOMOTIVE INSTRUMENT PANEL PAD

[75] Inventor: Tadashi Nishihara, Tokyo, Japan

[73] Assignee: Nissan Motor Company, Ltd., Yokohama, Japan

[21] Appl. No.: 458,889

[22] Filed: Jan. 18, 1983

[30] Foreign Application Priority Data

Feb. 22, 1982 [JP] Japan .................................. 57-27974

[51] Int. Cl.³ .............................................. B32B 37/00
[52] U.S. Cl. ........................................ 428/31; 180/90; 248/27.1; 280/752; 296/70
[58] Field of Search ................. 180/90; 280/750, 751, 280/752; 296/70; 428/31; 248/27.1

[56] References Cited

U.S. PATENT DOCUMENTS 1,731,835 10/1929 Wilson et al. ................. 248/27.1 X
2,855,066 10/1958 Nallinger ........................ 280/752 X
4,267,993 5/1981 Shimizu et al. ..................... 248/27.1
4,373,745 2/1983 Matsuno ............................ 296/70 X

*Primary Examiner*—Henry F. Epstein
*Attorney, Agent, or Firm*—Schwartz, Jeffery, Schwaab, Mack, Blumenthal & Koch

[57] ABSTRACT

An automotive instrument panel pad covering the instrument panel except for an opening formed therein, the pad being provided with a stepped portion which extends along the entire inner periphery of the pad and is interposed, adjacent to the margin of the opening, between the instrument panel and an outfit such as, for example, cluster lid mounted in such a manner as to cover the opening. With this construction, it is possible to avoid the occurrence of noise which would otherwise result from interference between the instrument panel and the cluter lid. It is also possible to realize an improved outward appearance.

7 Claims, 5 Drawing Figures

AUTOMOTIVE INSTRUMENT PANEL PAD

BACKGROUND OF THE INVENTION

1. Field of the Invention

This invention relates to an automotive instrument panel pad, and more particularly it pertains to such a pad fabricated by a molding technique called integral skinned foam process.

2. Description of the Prior Art

Integral skinned foam, which has been employed to form instrument panel pads, seats or the like, is produced by means of a process comprising the steps of mixing liquids of polyol, diisocyanate, catalyst and so forth in predetermined proportions, and immediately injecting and foaming the resultant liquid mixture in a mold.

Referring to FIG. 1, there is shown a conventional automotive instrument panel pad formed of integral skinned foam, shown at 4, which is fabricated by inserting an instrument panel 2 in a core mold 1, placing a cavity mold 3 on the core mold 1, injecting a liquid mixture of the aforementioned type in the cavity mold 3, and causing the thus injected liquid mixture to be foamed and solidified. As shown in FIGS. 2 and 3, a meter assembly 6 is mounted in an opening 5 formed in the instrument panel 2. An outfit such as, for example, a cluster lid 7 is attached in such a manner as to cover the meter assembly 6, and supported, at its end portions 7a and 7b, on a marginal portion 8 of the instrument panel 2 which is exposed out of the instrment panel pad 4, so that the instrument panel 2 can be united with the cluster lid 7.

However, the foregoing conventional arrangement is disadvantageous in that the exposed instrument panel pad 4, since it is formed of integral skinned foam as mentioned above, is of a low light resisting property and tends to be subjected to color change due to aging.

To cope with this, it has heretofore been proposed to apply an oil paint onto the surface of the instrument panel pad 4 by previously spraying the oil paint onto a mold release applied to the cavity mold 3.

Disadvantageously, however, a delicate positional deviation or misregistration on the order of microns tends to occur between the cavity mold 3 and the core mold 1 because of the applied oil paint film existing therebetween. As a result, a thin film 9, which consists of a liquid mixture substantially the same as the one forming the pad 4, is formed between the abutting surfaces B-B' of the molds 1 and 3 in such a manner as to cover the aforementioned opening 5 of the instrument panel 2, as shown in FIG. 4

At a later working step, the film 9 is removed; more specifically, that portion of the film 9 which exists between the circumferential line A-A' of the opening 5 as viewed in FIG. 4, is cut out while that portion of the film 9 which exists on the marginal portion 8, i.e., between A and B and between A' and B' as viewed in FIG. 4, is left as it is, for the purpose of avoiding the occurence of noise which tends to result from contact between the meter assembly 6 and the instrument panel 2, while at the same time preventing the instrument panel 2 from being viewed through gap 10 between the instrument panel pad 4 and the cluster lid 7.

In the case of the foregoing conventional instrument panel pad, for the purpose of sharply defining the position corresponding to the circumferential line A-A' of the opening 5, the removal of the film 9 should be effected either manually, using a manual cutter, or by resorting to a specialy prepared trimming mold. Disadvantageously, however, the former alternative can achieve only a limited productivity and is dangerous, while the latter alternative increases the production cost by the cost of preparing the trimming mold. Moreover, the film 9 tends to be cut out as far as the abutting surfaces B-B' in the case where the adhesion of the film 9 to the instrument panel 2 is weak, since irregularilities are usually present in the adhesion; as a result, the marginal portion 8 becomes exposed. Obviously, this makes the aforementioned attempt to leave the film on the marginal portion 8 as shown by A-B and A'-B' meaningless.

SUMMARY OF THE INVENTION

Accordingly, it is an object of the present invention to provide a novel and improved automotive instrument panel pad adapted to eliminate the aforementioned drawbacks of the prior art.

Briefly, the automative instrument panel pad according to the present invention is provided, at the entire inner periphery thereof, with a stepped portion which extends along the marginal portion of an opening formed in the instrument panel and adjacent to the ends of a cluster lid.

Other objects, features and advantages of the present invention will become apparent from the ensuing description taken in conjunction with the accompanying drawings.

DESCRIPTION OF THE PREFERRED EMBODIMENTS

Figure 1:
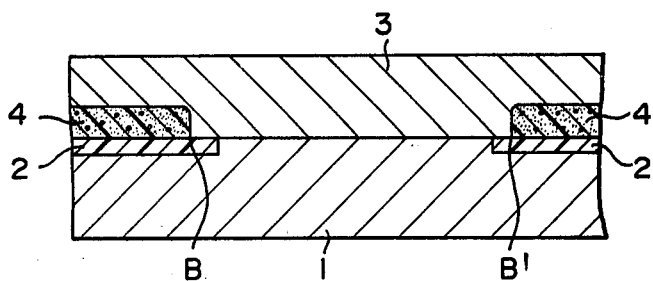
FIG. 1 is a fragmentary sectional view showing a conventional automative instrument panel pad and molds for fabricating the pad.
Figure 2:
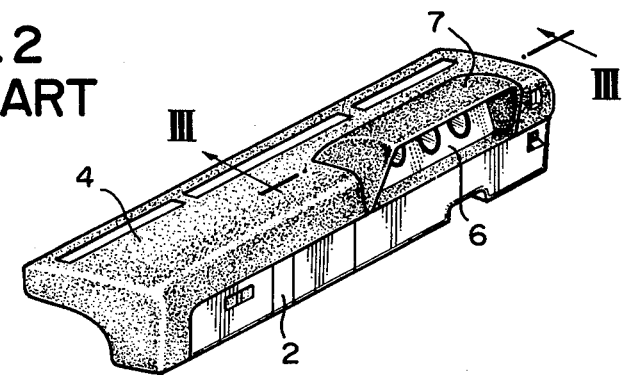
FIG. 2 is a perspective view showing the automative panel and other elements.
Figure 3:
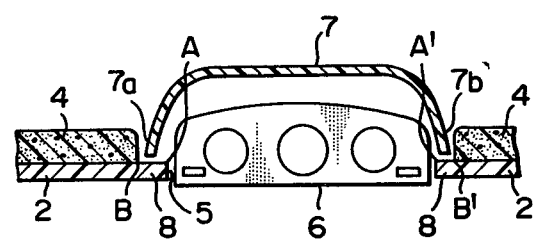
FIG. 3 is a longitudinal sectional view taken along the line III—III of FIG. 2.
Figure 4:
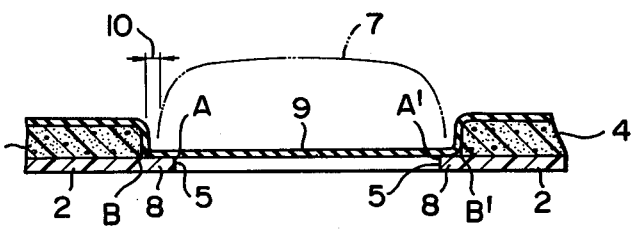
FIG. 4 is a view illustrating a film 9 which tends to be formed when the molds are disposed out of registration with each other.
Figure 5:
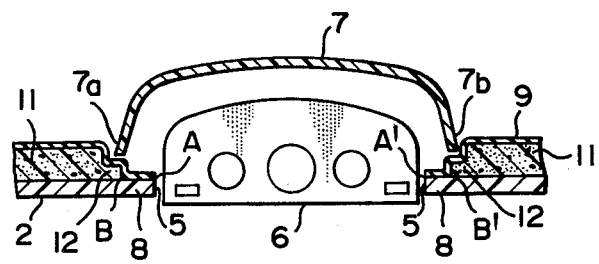
FIG. 5 is a view, similar to FIG. 3, illustrating the automotive instrument panel pad according to an embodiment of the present invention.

Referring to FIG. 5, there is shown the automative instrument panel pad according to an embodiment of the present invention, wherein parts corresponding to those of FIGS. 1 to 4 are indicated by like reference numerals, and further description thereof will be omitted.

In FIG. 5, the automotive instrument panel pad according to this embodiment is shown at 11. It is to be particularly noted that the pad 11 is provided, at the entire inner periphery thereof, with a stepped portion 12 which extends along marginal portion 8 of an opening 5 formed in an instrument panel 2 and adjacent to ends 7a, 7b of an outfit such as cluster lid 7.

With the above construction according to the present invention, even if it happens that when the film 9 such as shown in FIG. 5 is cut out at the opening 5, that portion of the film 9 which is disposed on the marginal portion 8 is torn off so that the instrument panel is exposed, such tearing-off of the film 9 can be prevented from proceeding beyond that base portion, shown at B, of the stepped portion 12 which is located inside of the cluster lid 7, thus having no adverse effect upon the outward appearance of the instrument panel assembly. Another advantage is such that by virtue of the face that the pad 11 and film 9 consist of substantially the same type of material, the film 9 is prevented from further peeling off, so that the film cutting-out procedure can be carried out manually and with ease.

As will be appreciated from the above discussion, according to the present invention, even if the film covering the opening of the instrument panel is torn off carelessly, such tearing-off of the film is limited not to proceed beyond the base of the stepped portion so that the pad per se is not adversely influenced thereby. Furthermore, the torn-off portion of the film is restricted inside of the cluster lid, so that any deterioration in the outward appearance of the instrument panel assembly, which would otherwise be caused, can be avoided. Another important advantage is such that the aforementioned stepped portion serves to prevent interference of the cluster lid end portion with the instrument panel, thus precluding the possibility that noise due to such interference is generated.

While the present invention has been described and illustrated with respect to a specific embodiment thereof, it is to be understood that the present invention is by no means limited thereto but covers all changes and modifications which will become possible within the scope of the appended claims.

What is claimed is:

1. An automotive instrument panel pad covering an instrument panel except for an opening formed therein, including a stepped portion extending along the entire inner periphery of the pad, said stepped portion being interposed, adjacent to the margin of said opening, between said instrument panel and the bottom end of a cover member mounted in such a manner as to cover said opening.

2. An automative instrument panel pad as set forth in claim 1, wherein the base of said stepped portion is located inside of said cover member.

3. An automative instrument panel pad as set forth in claim 1, wherein said pad is formed of integral skinned foam.

4. An automotive instrument panel pad as set forth in claim 2, wherein said pad is formed of integral skinned foam.

5. In combination, an automotive instrument panel having an opening formed therein,
   an instrument panel pad covering said panel, said panel pad comprising:
      an inner peripheral edge surrounding said opening,
         a stepped portion formed on said inner peripheral edge, said stepped portion being spaced from said opening such that an edge portion of said panel extends beyond said stepped portion, said pad further including a thin exterior film covering said stepped portion and directly engaging said panel edge portion, and
      a cover member mounted on said stepped portion to cover said opening, said edge portion being disposed inside of said cover member.

6. A combination as set forth in claim 5 wherein said pad comprises integral skinned foam.

7. A combination as set forth in claim 5 wherein said cover member is a cluster lid.

* * * * *